United States Patent [19]

Matre

[11] Patent Number: 5,632,357
[45] Date of Patent: May 27, 1997

[54] COMBINED STAIRS AND PERSON HOIST

[76] Inventor: Vigbjørn Matre, Ormerudveien 59A, N-1410, Kolbotn, Norway

[21] Appl. No.: 360,848
[22] PCT Filed: Jun. 24, 1993
[86] PCT No.: PCT/NO93/00097
 § 371 Date: Dec. 23, 1994
 § 102(e) Date: Dec. 23, 1994
[87] PCT Pub. No.: WO94/00373
 PCT Pub. Date: Jan. 6, 1994

[30] Foreign Application Priority Data

Jun. 24, 1992 [NO] Norway ............. 922502

[51] Int. Cl.⁶ ............................ B66B 9/08
[52] U.S. Cl. ........................ 187/200; 280/166
[58] Field of Search ................. 187/200, 201, 187/245; 414/921; 280/166

[56] References Cited

U.S. PATENT DOCUMENTS

| | | |
|---|---|---|
| 784,832 | 3/1905 | Bracegirdle . |
| 2,362,170 | 11/1944 | Swaisgood ............... 304/29 |
| 3,912,298 | 10/1975 | Humphrey ............... 280/166 |
| 4,457,402 | 7/1984 | Vecchio et al. ........... 187/200 |
| 5,154,569 | 10/1992 | Eryou et al. ............. 414/495 |

FOREIGN PATENT DOCUMENTS 8701577  6/1990  Sweden .

Primary Examiner—Kenneth Noland
Attorney, Agent, or Firm—Cushman Darby & Cushman, L.L.P.

[57] ABSTRACT

A combined stairway and hoist so constructed that it can be adapted in many fields of use, especially for handicapped people in buildings and public transportation. The stairway together with the platform can be raised and lowered by means of parallel stays which at one end are pivotally connected to a support at the upper end of the stairway, the parallel stays along their length being pivotally connected to a number of additional stays which are connected to respective steps and are vertical in operating position.

10 Claims, 12 Drawing Sheets

COMBINED STAIRS AND PERSON HOIST

BACKGROUND OF THE INVENTION

The invention relates to a combined stairway and lift apparatus, comprising a stairway which, by a lifting means, can be raised and lowered at least at one end, and which is designed so that the steps all the time are horizontal during the raising or lowering movement, the stairway in a horizontal position forming a planar surface flush with a raisable and lowerable platform.

An apparatus of the above-mentioned type is known from SE laying-open print No. 462 335. This known apparatus consists of an elevator portion and a stairway portion connected thereto, wherein the elevator portion comprises an elevator platform which is raisable and lowerable between at least two levels, and wherein the stairway portion is connected to the elevator portion in such a manner that the stairway portion automatically follows the movements of the elevator portion, so that the stairway portion in a lowered position forms a planar surface on which a load can be run onto the elevator platform. The apparatus may be used as a stairway and/or a lift between stories in a house, as a loading platform with side stairway at a loading quay, as a freight elevator in storage premises, etc. The construction of the apparatus implies, however, substantial restrictions with respect to fields of use. Among other things, it cannot be adapted for use as, e.g., a wheelchair lift in public means of transportation, such as buses, railway cars, etc., with a varying entering height.

In the recent time, there has been carried out some research activity with respect to the possibilities of arranging the conditions for handicapped persons in public means of transportation. In this connection, it has become clear that today there do not exist sufficiently good and quick solutions for lifts which can be recommended for short-distance traffic with buses or the like. In public means of transportation for short-distance traffic, there must be made heavy demands on regularity, and it will then not be of current interest to install lifts which become too time-consuming and make too heavy demands on drivers/conductors.

A combined stairway and lift apparatus for public means of transportation should also have a flexible construction which, in operation, can be adapted to varying operating conditions, especially with regard to varying entering height. Thus, the apparatus should be able to be adapted to city buses and trams with a very low entering height, and further to buses, trams, railway cars, etc., having a relatively high entering height, and, moreover, to varying platform heights in connection with railway cars.

Transport of handicapped persons, and especially wheelchair users, is a big problem also in airplanes, ships, and ferries. For example, the operation of bringing a passenger which is a wheelchair user on board an airplane, implies a physically great load on the personnel, and in addition it is degrading for the passenger. In practice, it often takes place in the manner that the wheelchair user has to appear at the air terminal a long time before the other passengers, in order then to be placed in another wheelchair. He or she is then carried up the aircraft stairway by two persons of the staff, in order thereafter to be lifted over into a usual chair.

When using a combined stairway and lift apparatus as a gangway in seagoing vessels, there is, at the starting point, also a need to be able to vary the height of the apparatus because of the tide.

Thus, there is a need for a combined stairway and lift apparatus which is suitable for solving the above-mentioned problems in different fields of transportation.

There is also a need for an improved, combined stairway and lift apparatus which is suitable for use by wheelchair users in buildings, indoor as well as outdoor. The usual alternative today in connection with low stairways is a fixed ramp, indoor as well as outdoor. These are very bulky because of the severe demands to a limited upward gradient, and in many cases are not considered as an acceptable solution. This applies, e.g., in churches where, as a rule, there are several steps from the church room to the altar, but where the authorities for aesthetic reasons do not accept a permanent ramp. In many cases a ramp neither is of any interest in private residences, and a scissors-type lift may also be an expensive and space-demanding solution.

SUMMARY OF THE INVENTION

On this background, it is an object of the invention to provide a combined stairway and lift apparatus for public means of transport, wherein the apparatus is simple as well as quick to operate and has a construction which is flexible and, in operation, may be adapted to varying operating conditions, and wherein the apparatus simultaneously satisfies the current demands on efficiency and safety for the passengers.

Another object of the invention is to provide such a combined stairway and lift apparatus which may also be adapted for use as a gangway stairs and a lift in connection with aircraft as well as seagoing vessels, i.e. airplanes, helicopters, ferries, passenger boats, etc.

Another object of the invention is to provide such a combined stairway and lift apparatus which may also be adapted for use as an indoor as well as an outdoor stairway for buildings, and which, when required, may be used as a lift device for handicapped persons, such as wheelchair users.

The above-mentioned objects are achieved by means of a combined stairway and lift apparatus of the introductorily stated type which, according to the invention, is characterized in that the platform is interconnected with the stairway at the lower end thereof, and that the stairway together with the platform can be raised and lowered by means of parallel stays which at one end are pivotally connected to a support means at the upper end of the stairway, the parallel stays along their length being pivotally connected to a number of additional stays which are connected to respective steps and are essentially vertical in operating position.

BRIEF DESCRIPTION OF THE DRAWINGS

The invention will be further described below in connection with a number of exemplary embodiments which are schematically shown in the drawings, wherein.

In the different drawing figures corresponding members, such as parallel stays, vertical stays, steps, etc., are partly designated by the same reference numerals in the different embodiments.

DETAILED DESCRIPTION

Figure 1:
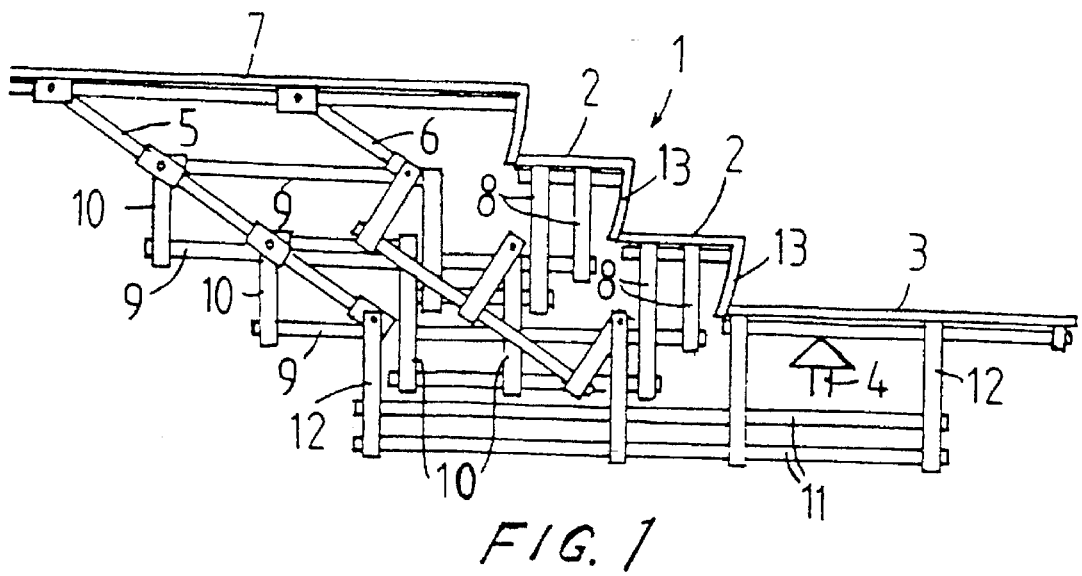
FIG. 1 shows a side view of a combined stairway and lift apparatus installed in an existing stairway wherein all stays are to be concealed.
Figure 2:
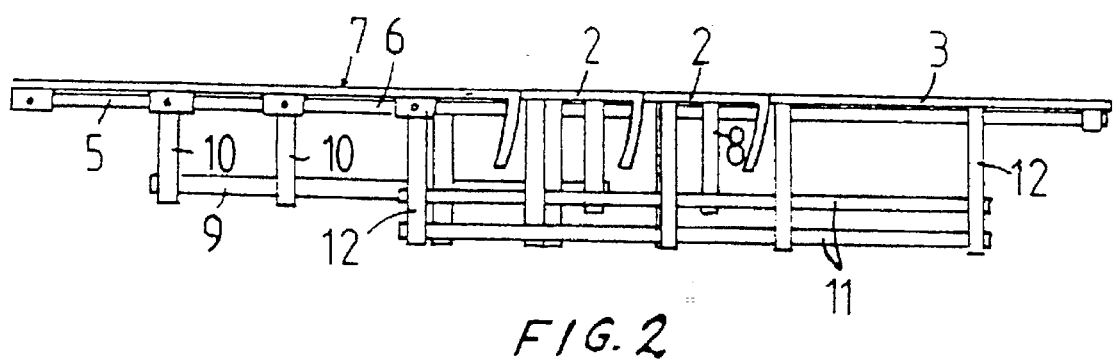
FIG. 2 shows a side view of the apparatus in FIG. 1 wherein the stairway and the lift platform are raised to a horizontal plane flush with the floor at the upper end of the stairway.

In FIGS. 1 and 2 there is shown an embodiment wherein the combined stairway and lift apparatus according to the invention is built into an existing stairway in a building, in such a manner that all stays are concealed. The structure comprises a stairway 1 having a number of steps 2, and a platform 3 which is interconnected with the stairway at the lower end thereof and which, together with the stairway, can be raised and lowered by a lifting means suggested at 4, the steps and the platform being interconnected by means of a special stay system arranged below the steps. The stay system comprises a pair of parallel stays 5 and 6 which, at their upper end, are pivotally connected to a support means which is here constituted by a floor structure 7 at the upper end of the stairway, and which further along their length are connected to a number of additional vertical stays 8 which are rigidly connected to the underside of respective steps. In principle, the parallel stays 5, 6 might have been pivotally connected directly to the vertical stays 8. However, among other things, to achieve a low building height, the two stay types here are interconnected via a lever system consisting of horizontal and vertical arms 9 and 10, respectively. Further, also the platform 3 is connected to the parallel stays 5, 6 through horizontal and vertical arms 11 and 12, respectively.

The lifting means 4 may consist of, e.g., an electric screw or a hydraulic or pneumatic means, e.g. a suitable cylinder/piston unit. When the platform 3 is raised or lowered by means of the lifting means, the tread surface of the steps with the illustrated arrangement all the time will be horizontal. As shown, the steps have vertical front parts 13 which are suitably curved to take into account that they are moved in a circular path having a radius determined by the length of the parallel stays.

Figure 3:
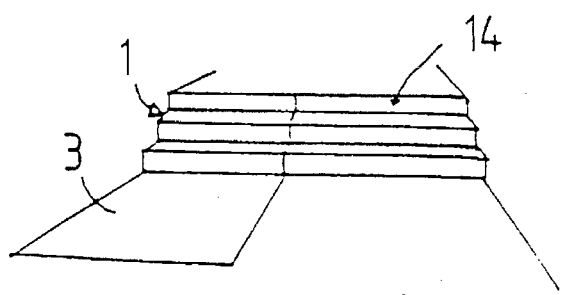
FIG. 3 shows a perspective view of a stairway with the apparatus according to FIGS. 1 and 2 installed in a concealed manner at the left side of the stairway.

FIG. 3 shows a perspective view of a stairway wherein the apparatus in FIGS. 1 and 2 is installed in a concealed manner at the left side of the stairway. The apparatus comprising the stairway 1 and the lift platform 3 here may fully replace an ordinary stairway.

Figure 4:
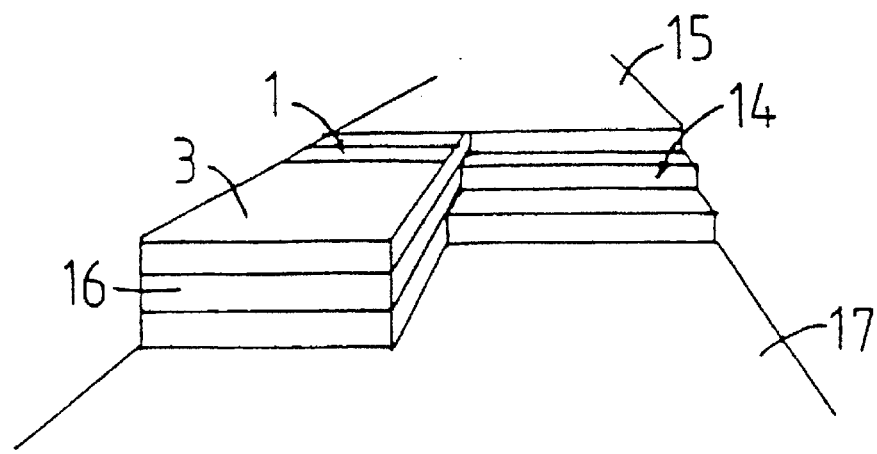
FIG. 4 shows the stairway in FIG. 3 with the apparatus raised to said horizontal plane.

FIG. 4 shows the apparatus in FIGS. 1–3 raised to the horizontal position in FIG. 2, wherein the stairway and the platform form a planar surface flush with the floor 15 at the upper end of the stairway. As shown, there is here formed a shielding 16 between the raised platform 3 and the lower floor surface 17. This consists, e.g., of aluminium profiles which, when raised, engage into each other and thereby form a compact surface. This is advantageous, both for safety reasons and for aesthetical considerations. When the platform is lowered, the profiles are located within each other and occupy minimum space under the floor. A simpler variant may be such a profile which is spring-loaded and which moves above the floor edge when the platform is raised, and then will function as a "toe protector".

Figures 5A, 5B:
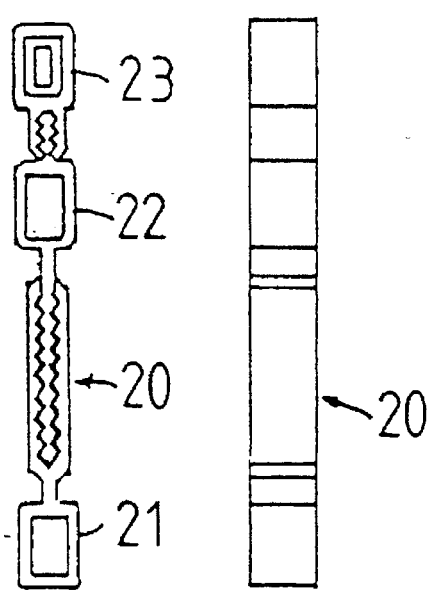
FIGS. 5–7 show examples of profile elements for the manufacture of structural members having suitable dimensions/lengths for interconnection of the stays in an apparatus of the type according to FIGS. 1 and 2.
Figures 6A, 6B:
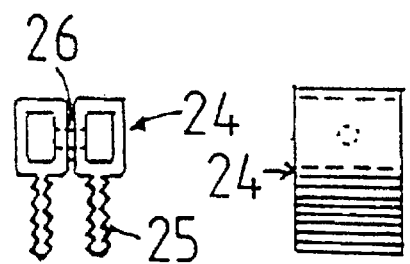
Figures 7A, 7B:
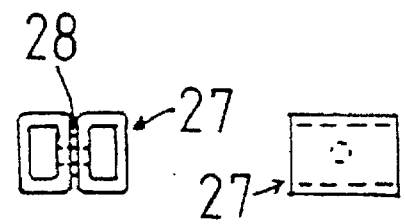

When building-in the above-described apparatus in existing stairways, the structural members must be adapted to the dimensions of the existing stairway. Since the height as well as the width of the steps will vary, it will be advantageous to be able to make use of a system of structural members which may easily be adapted to the topical dimensions. Such a flexible system, consisting of fastening means and profiles, e.g. of aluminium, which are adapted according to heights and widths of the steps, etc., is shown in FIGS. 5–7. Thus, FIGS. 5A and 5B show an end view and a side view, respectively, of a profile element 20 consisting of three hollow profile members 21, 22, 23 which are interconnected by means of a groove-and-tongue arrangement having mutually engaging teeth. FIGS. 6A and 6B show a pair of hollow profile members 24 having toothed engagement portions 25, and which are interconnected via a rotating connection which, e.g., may consist of a bolt (not shown) which is carried through mating holes (suggested with dashed lines) and an intermediate disc 26. FIGS. 7A and 7B show a pair of hollow profile members 27 which are also interconnected via a corresponding rotating connection having an intermediate disc 28.

Figure 8:
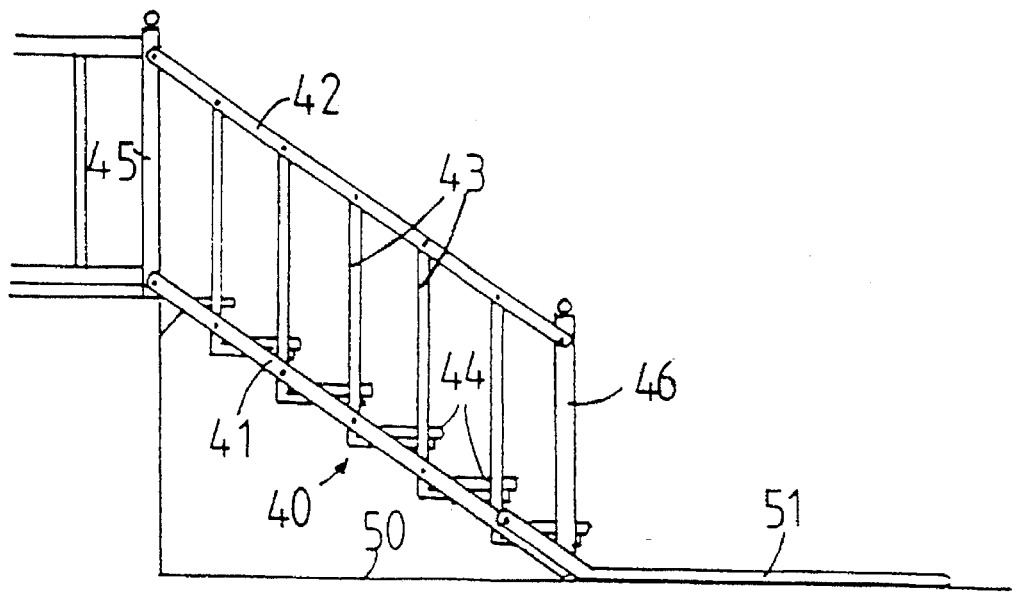
FIGS. 8 and 9 show side views of a combined stairway and lift apparatus intended for indoor use, in two different positions.
Figure 9:
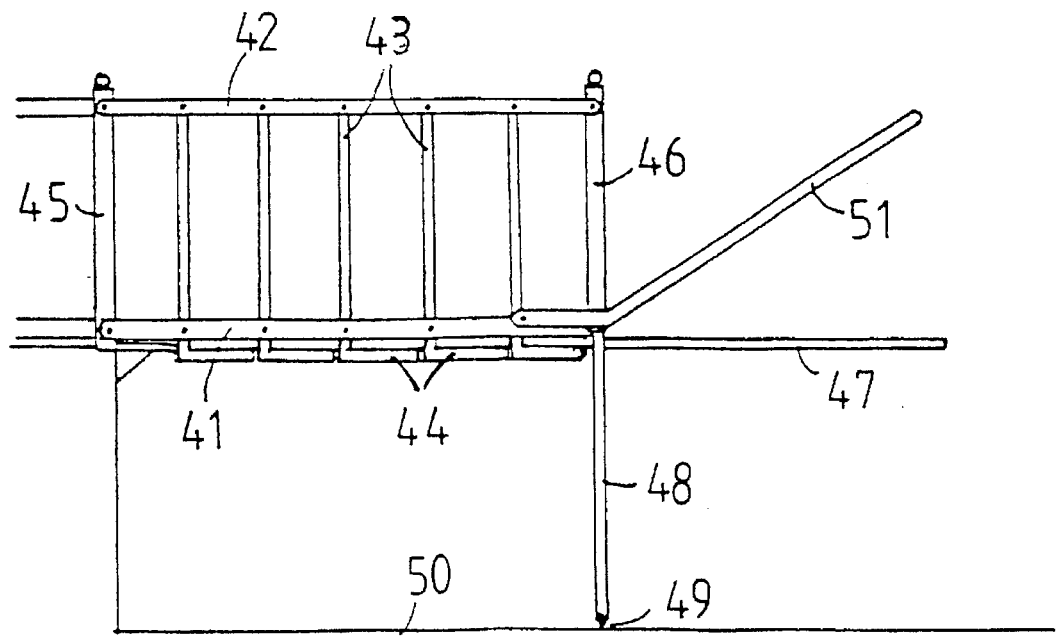

Another embodiment of the apparatus according to the invention is shown in side views in FIGS. 8 and 9. In this embodiment, the two parallel stays 41 and 42 constitute a string and an upper railing member, respectively, along the side of the stairway 40, and the vertical stays 43, which are articulated to the string 41 and the railing 42, form balusters in the railing. As it will be appreciated, corresponding stays normally will be arranged on either side of the stairway. The steps 44, which are arranged at the lower ends of the stays 43, are shown to be rigidly connected to the stays, at right angles thereto. For safety's sake, however, it may be advantageous that the steps are hinged at their rearward edge, in order to avoid squeeze injuries when raising the stairway to the position in FIG. 9.

The support means for connection of the upper ends of the parallel stays 41, 42 here are constituted by a vertical column 45 mounted at the top of the stairway. At their lower end the parallel stays 41, 42 are also pivotally connected to a vertical column 46 to the lower end of which the lift platform 47 of the apparatus is rigidly fastened. The column 46 suitably may be hollow, with the lifting means 48 of the apparatus mounted within the column. The lifting means e.g. may consist of an electrical screw and be supported by a wheel 49, for movement along the base 50 when raising an lowering the stairway and the platform.

A safety hoop 51, which is essentially U-shaped in plan view and extends around the sides and rearward edge of the platform 47, as shown is hingedly connected to the string 41 on each side of the stairway. This hoop will be lifted, as shown in FIG. 9, when raising the platform 47, to ensure that a wheelchair or the like does not roll off the platform when this is in the raised position. The hinge connection of the hoop protects against squeeze injuries in lowering of the lift platform. A corresponding or similar hoop may also be used in other embodiments of the apparatus according to the invention, e.g. in the embodiment according to FIGS. 1–3.

The embodiment in FIGS. 8 and 9 is intended for indoor use, where most of the structure may be carried out in wood. The combined stairway and lift apparatus will function as an ordinary stairway and with respect to the interior depart little from the remaining interior. The apparatus will be favourable in rooms where the place does not allow the provision of a ramp, or other traditional variants.

Figure 10:
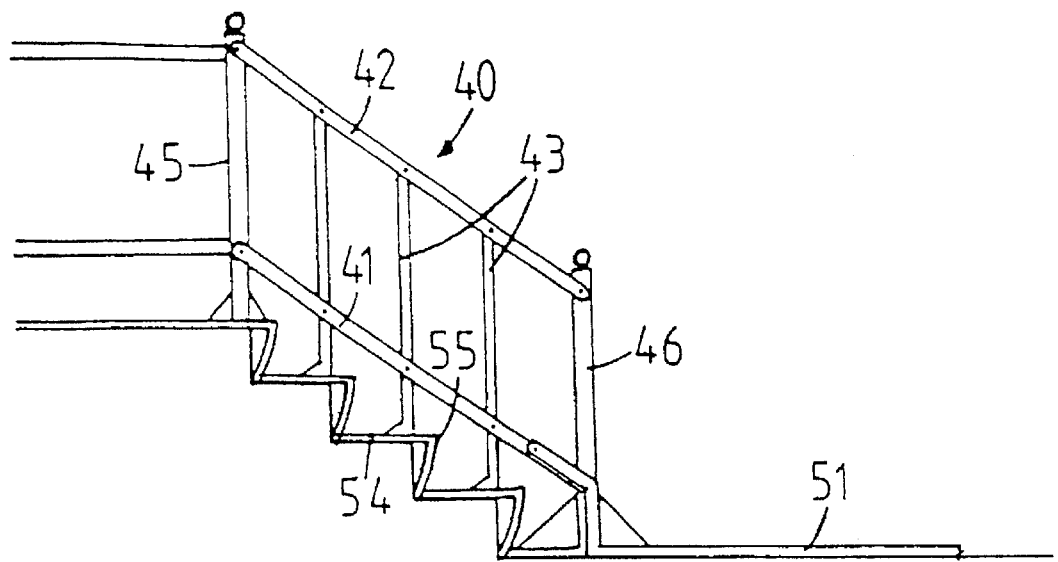
FIGS. 10 and 11 show side views of a combined stairway and lift apparatus intended for outdoor use, in two different positions.
Figure 11:
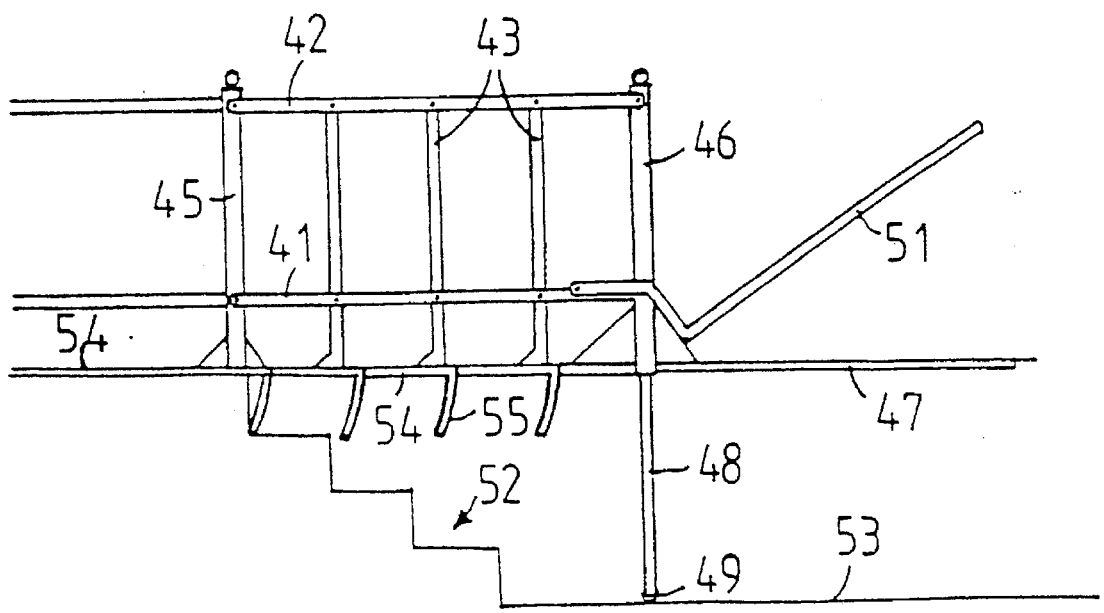

FIGS. 10 and 11 show an embodiment resembling the embodiment in FIGS. 8 and 9, and where corresponding parts in these figures are designated by like reference numerals. The embodiment in FIGS. 10 and 11 is, however, intended for outdoor use, and is shown to be arranged in connection with and adapted to an extending flight of steps 52 extending from a lower level 53 to an upper level 54. A difference in relation to the embodiment in FIGS. 8 and 9 is that the steps 54 here are provided with front parts 55 to completely conceal the steps in the existing flight of steps 52 when the combined stairway and lift apparatus is in the lowered position (FIG. 10).

Figure 12:
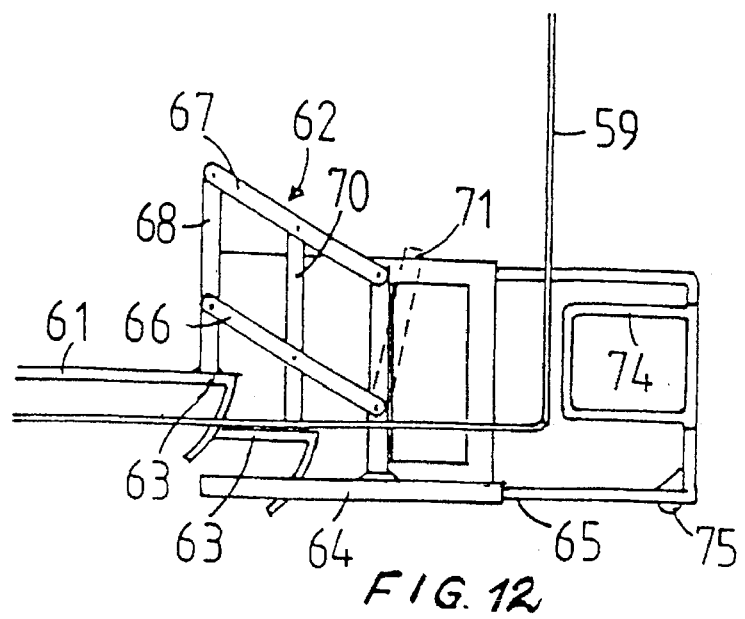
FIG. 12 shows a side view of a combined stairway and lift apparatus intended for use in a public means of transport (bus, tram, railway car) having a relatively low entering height.
Figure 13:
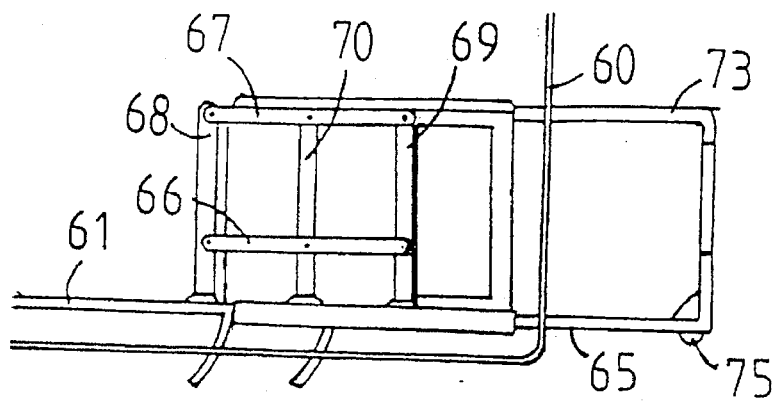
FIG. 13 shows the apparatus in FIG. 12 with the stairway and the lift platform raised to a horizontal plane flush with the floor in the vehicle.
Figure 14:
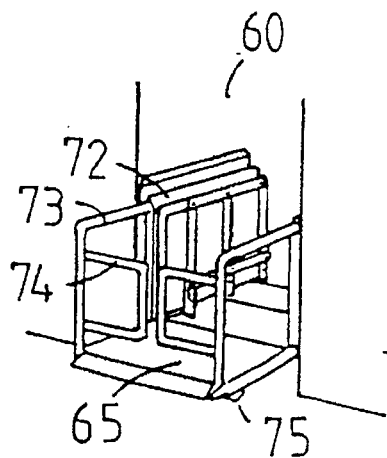
FIGS. 14–16 show perspective views of the apparatus in FIGS. 12 and 13 in different operating positions.
Figure 15:
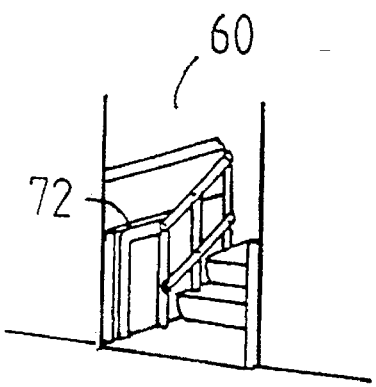
Figure 16:
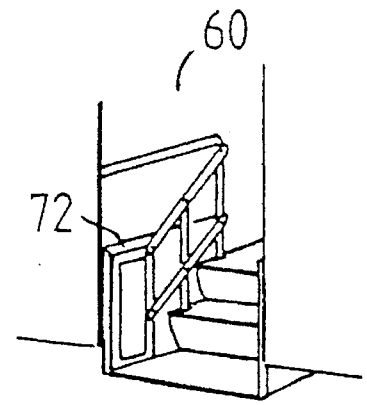

In this embodiment, the lift platform may be executed in expanded metal and function as a grating for the stairway. In case of a higher stairway, there may be arranged railings and gates on the platform, as shown, e.g., in the embodiments according to FIGS. 12 and 17. The steps and the stairway in other respects may be adapted to style and choice of material according to wish. It may be advantageous to install heating cables in the stairway, to obtain an ice-free stairway and secure a good function also in the winter.

A further embodiment of the combined stairway and lift apparatus according to the invention is shown in FIGS. 12–16. This embodiment is intended for use in vehicles having a relatively small entering height, i.e. city buses, trams, subway carriages, etc.

In FIGS. 12–16 a side wall of a vehicle is designated by 59, a door opening in the side wall is designated by 60, and the floor inside the vehicle by 61. The apparatus comprises a stairway 62 having two steps 63 and a lower auxiliary step constituted by an inner half 64 of a lift or wheelchair platform 65, and further a pair parallel stays 66 And 67 (on each side of the stairway), which, at their upper ends, are pivotally connected to a stationary column 68, at their lower ends are pivotally connected to an additional column 69 which is rigidly fastened to the platform 65, and in the middle are pivotally connected to a vertical stay 70 which is rigidly fastened to the central step 63. (Of course, there may be arranged more steps and vertical stays according to requirement.) The lifting means 71 of the apparatus is shown with dashed lines in FIG. 12 and may consist of a pair of hydraulic cylinders mounted on either side of the apparatus, and which are each coupled to the lower end of the railing in the vicinity of the wheelchair platform. The lifting means may be concealed behind a flexible cover 72 which may be arranged between the railing 66–70 and the car body, as suggested in FIGS. 14–16.

As mentioned, the platform 65 is bipartite and consists of two halves lying on top of each other when the platform is in its inner position. The platform may be pushed out to the position shown in FIGS. 13 and 14 by means of an electro-motor (not shown) on each side of the platform. These motors possibly may drive corresponding screws in extractable railing members 73 on each side of the platform. At the front edge of the platform, there is provided a safety gate consisting of a pair of gate members 74 which are pivotally mounted on the railing members 73 and can be pivoted 270° from a folded position parallel with the railings to the position shown in FIG. 1. When moving back, the gate members 74 are pivoted an angle of 90° to the folded position.

As shown, the platform 65 is also provided with wheels 75 to secure a safe and lenient movement in the longitudinal direction. At its forward edge the platform may be provided with a sensor, e.g. a photocell, to be able to stop quickly in case of possible obstacles. The upper half of the platform may be executed in expanded metal.

In FIGS. 17–20, there is shown an embodiment of the apparatus resembling the embodiment in FIGS. 12–16, and wherein corresponding members in these figures therefore are designated by like reference numerals. The embodiment in FIGS. 17–20 is, however, intended for use in buses, trams, railway cars, etc. having a relatively large entering height. In practice, this implies that the stairway and the platform in some cases should be raised somewhat during driving. Further, it implies that the bipartite platform in stored position must be pushed completely under the stairway. Thus, as distinct from the embodiment in FIGS. 12–16, both of the halves of the platform in the embodiment according to FIGS. 17–20 are extractable from an inner position. The platform 76 here is shown to consist of an inner and a outer half 77 and 78, respectively, and these two halves are provided with railing members 79 and 80, respectively, in the form of telescopic tubes which can be pushed into each other, and further can be pushed into respective tube-receiving holder members 81 arranged on either side of the railing 66–70 of the stairway and being fixedly connected thereto.

Figure 18A:
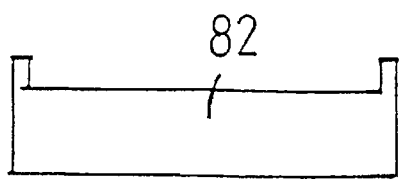
FIGS. 18A, B, C show details of a wheelchair stopper at the rearward end of the platform in the apparatus in FIG. 17.
Figures 18B, 18C:
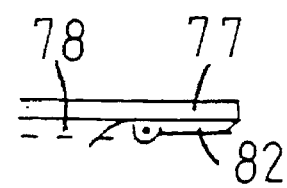

On the outer railing members 80, there are mounted safety gate halves 81, in a corresponding manner to that of the preceding embodiment. Furthermore, the platform at its front edge is provided with a wheelchair stop 82 in the form of a plate which is hingedly connected to the lowermost platform member 78, as shown in FIGS. 18A, B, C. When this platform member is pushed forward, the stop 82 will be exposed as shown in FIG. 18B. The stop is also shaped so that it becomes easier to a wheelchair or the like to drive onto the platform. A corresponding stop may be arranged on the platform in the embodiment in FIGS. 12–16.

Figure 17:
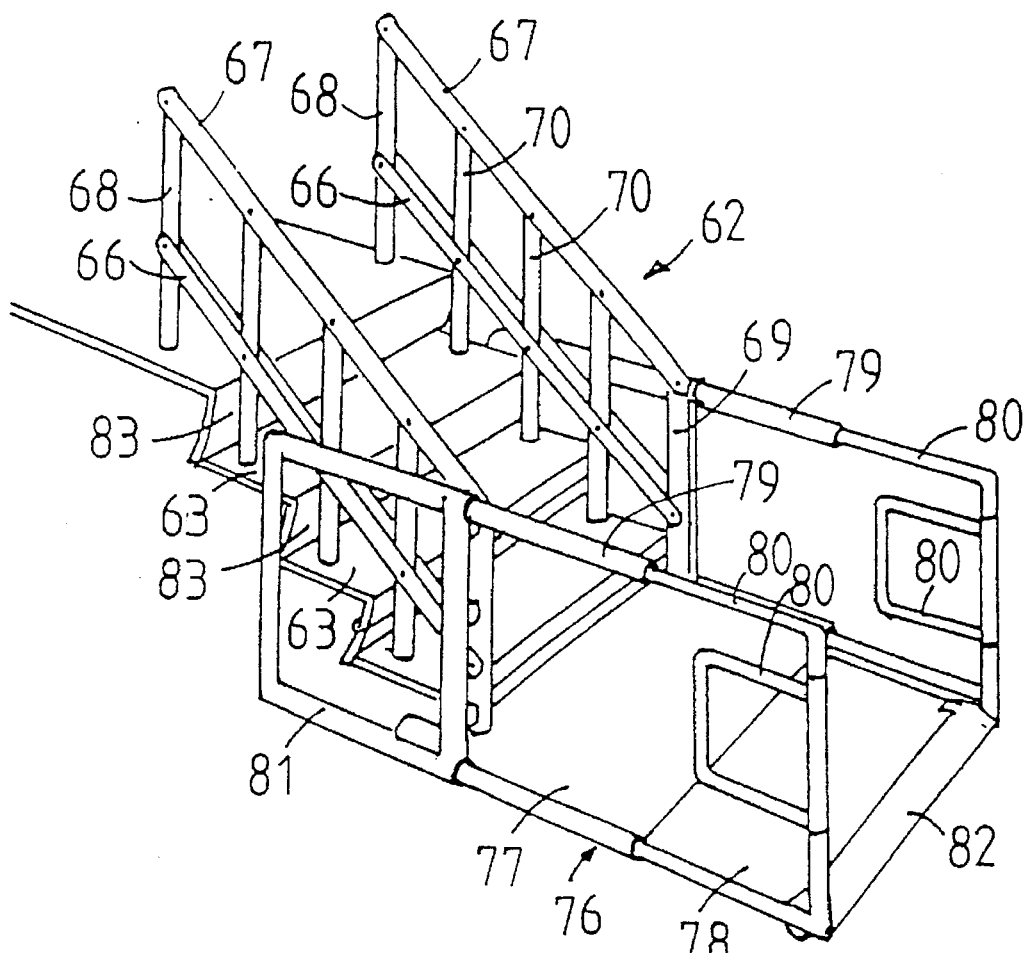
FIG. 17 shows a perspective view of a combined stairway and lift apparatus intended for use in a public means of transport having a relatively high entering height.
Figure 19:
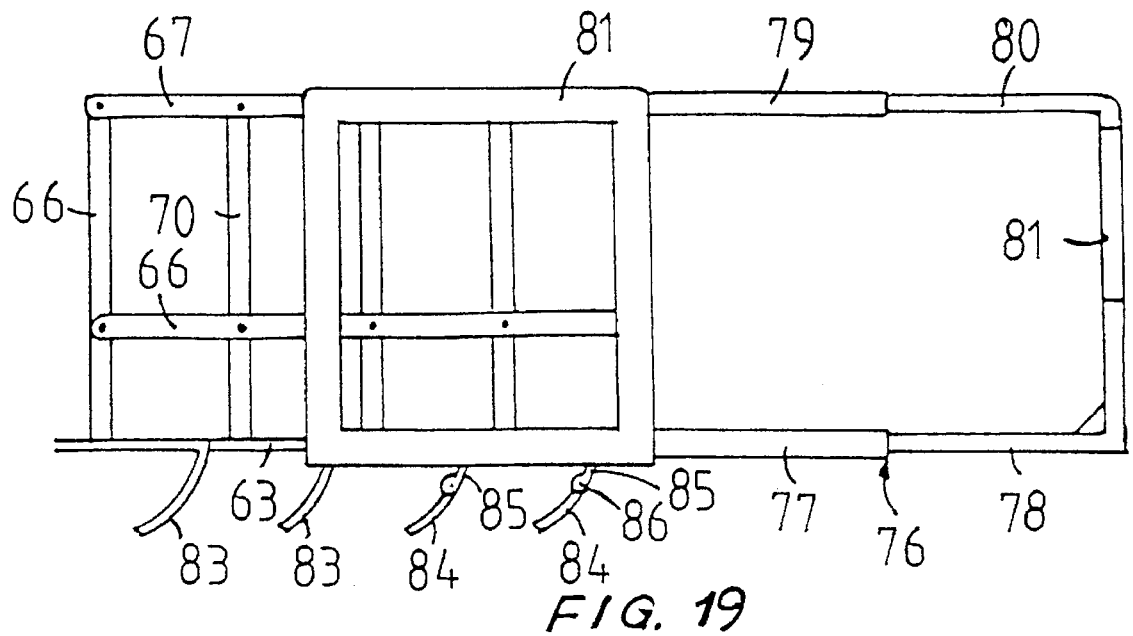
FIGS. 19 and 20 show the apparatus in FIG. 17 in two different positions.
Figure 20:
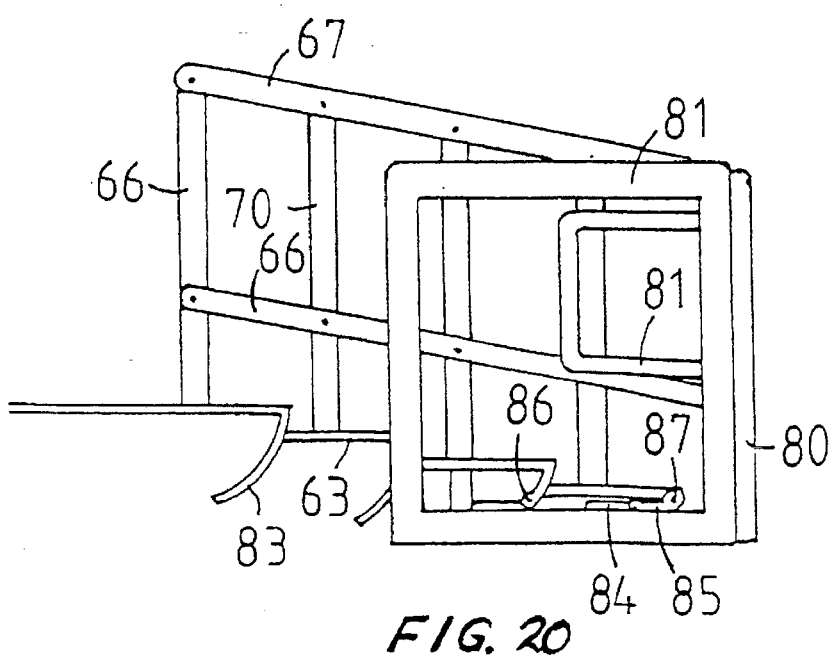

As shown in FIGS. 17, 19 and 20, the steps or treads 63 are provided with fixed front parts 83, so that there is no intermediate space between the steps when the stairway is in the lowered position in FIG. 17. In order with this embodiment to enable the above-mentioned raising of the platform 76 when this is in the completely pushed-in storage position, the front parts on the two lowermost steps are divided in the longitudinal direction of the steps into two halves 84 and 85 which are hinged to each other in a longitudinally extending hinge connection 86. The upper front part 85 of the lowermost step, in addition, is hinged to the horizontal step member in a hinge connection 87. The two lowermost steps then may be folded as shown in FIG. 20, wherein the apparatus is shown in its storage position with raised platform. The two hinge connections are spring-loaded, so that the front parts without any external pressure influence are maintained in their normal position (shown in FIGS. 17 and 19). In its storage position, the platform may impinge on suitable rubber blocks or the like, to avoid vibrations during driving.

The apparatus possibly may be provided with a suitable insulation means under the steps and under the lowermost platform member, to insulate against cold in the winter. Besides, it is an advantage of the structures according to FIGS. 12–20 that most of the stays and points of rotation are located within the vehicle, and consequently are not subjected to cold and ice under severe climate conditions.

Further, it will be clear that the disclosed solutions offer the desired flexibility and easily can be adapted to the different operating conditions which may occur on the topical vehicles. The shown lift apparatus not only is well-suited for use for wheelchair users, but is also very well-suited for lifting of perambulators with companion, passengers with bicycles, shopping carriages, etc. For passengers with reduced health the platform may be lowered down and the person in question be lifted up, so that he may walk into the vehicle when the platform is raised.

Figure 21:
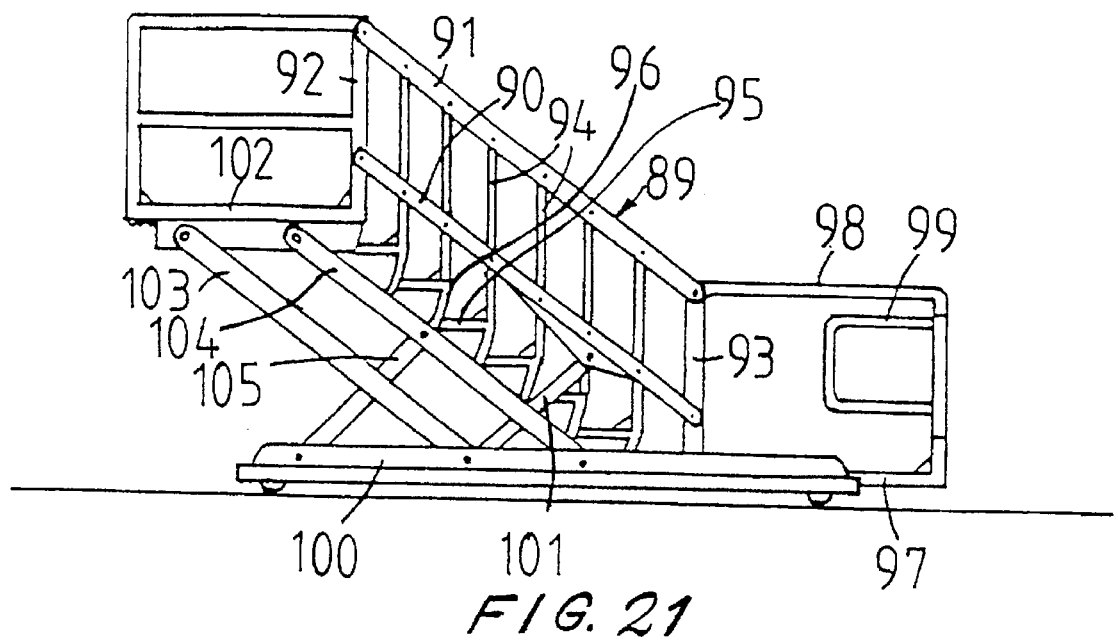
FIGS. 21 and 22 show side views of a combined stairway and lift apparatus which is constructed for use as a gangway or aircraft stairway for relatively low heights.
Figure 22:
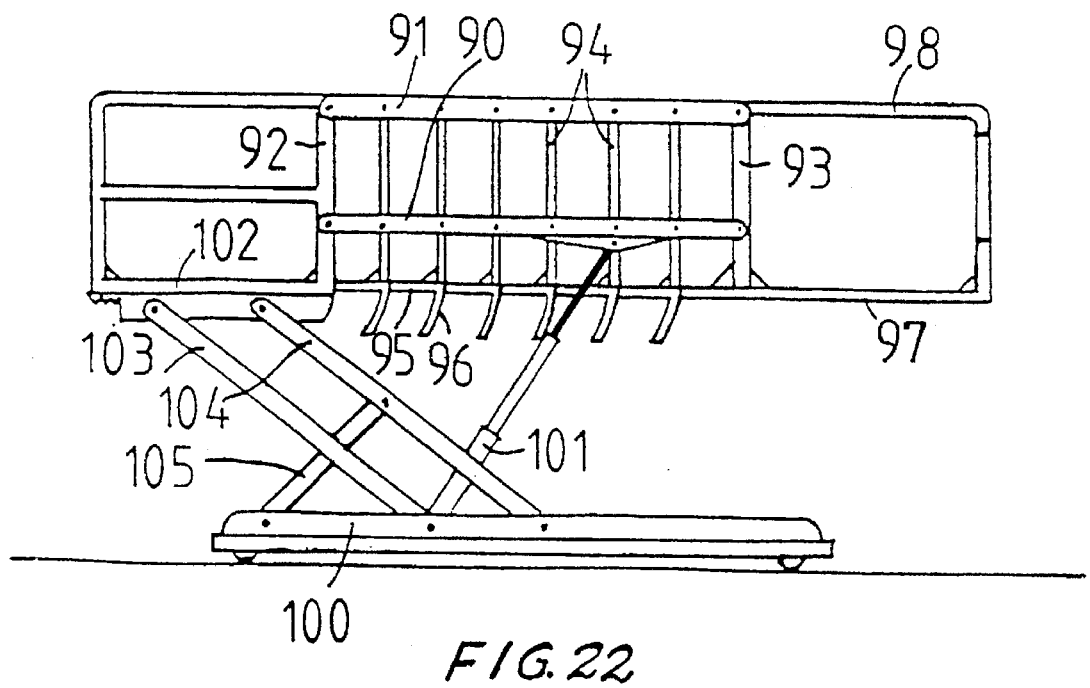

A further embodiment of a combined stairway and lift apparatus according to the invention is shown in FIGS. 21 and 22. This embodiment is intended for use as a gangway for a vessel or as an aircraft stairs for relatively low heights. The structure may be executed in expanded metal, and be so light that it may be pushed. The combined stairway and lift apparatus itself is constructed in a manner corresponding partly to the embodiment according to FIGS. 10 and 11, and partly to the embodiments according to FIGS. 12 or 17. Thus, the apparatus comprises a pair of parallel stays 90 and 91 (on each side of the stairway) which, at their upper ends, are pivotally connected to a support means comprising a vertical column 92, at their lower ends are pivotally connected to a lower column 93, and along their length are connected to a number of vertical stays 94 which are in turn rigidly connected to respective steps or treads 95 having downwards depending front parts 96. A platform 97 is rigidly fastened to the lower column 93 and is provided with a railing 98 having a hinged safety gate 99. The apparatus is mounted on a wheeled mobile underframe 100, and the stairway with the lift platform 97 may be raised and lowered by means of a lifting means 101 which is connected between the underframe 100 and the lower parallel stays 90.

A substantial difference in relation to the above-mentioned embodiments is, however, that the upper support means of the parallel stays 90, 91 not only consists of the column 92, but comprises a platform 102 which is raisable and lowerable relative to the underframe 100 by means of a height-adjustable supporting means. In the illustrated embodiment this means comprises a pair of tilted parallel stays 103, 104 which are carried by the underframe 100 and support the platform 102 in horizontal position, and a lifting means 105 which is connected between the underframe and one 104 of the stays, to be able to raise or lower the platform 102. Both of the two lifting means 101 and 105 may, for example, consist of a manual jack, a hydraulic or pneumatic cylinder/piston unit or an electric screw. When using hydraulics or pneumatics, a pressure tank may be coupled to the cylinder/piston unit.

This apparatus offers the possibility for a great variation of platform height, and a simple adaptation to a variable water level, etc. One obtains here a stairway which always has horizontal steps and therewith a good accessibility for all passengers. Further, one achieves that the stairway may be raised to a horizontal position wherein it forms a planar surface on the correct level, and together with the platform 97 provide a fully qualified lift which may be used for wheelchairs, perambulators, etc.

Figure 23:
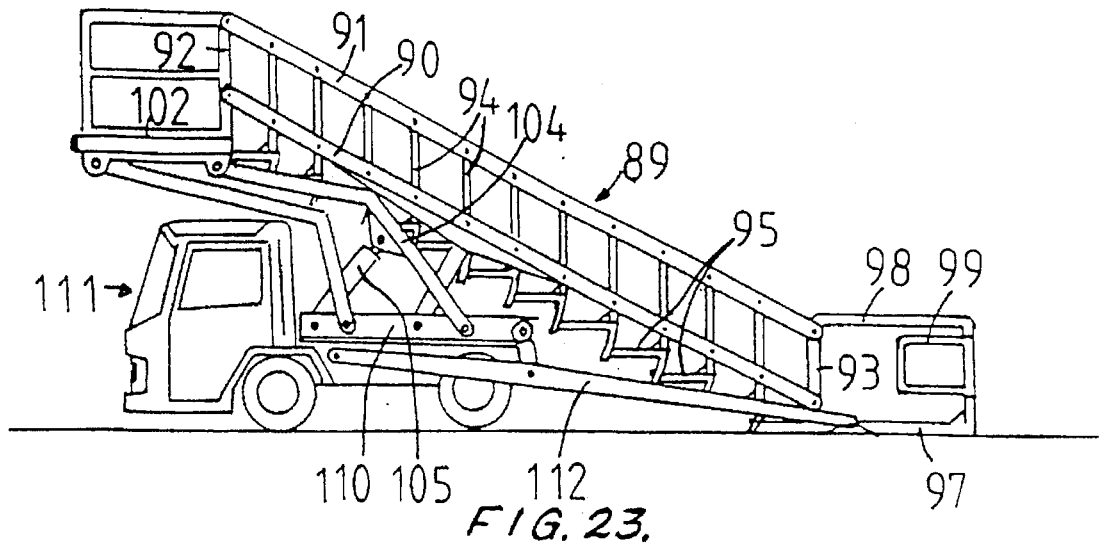
FIGS. 23 and 24 show side views of a large aircraft stairway installed on the plane of a small lorry.
Figure 24:
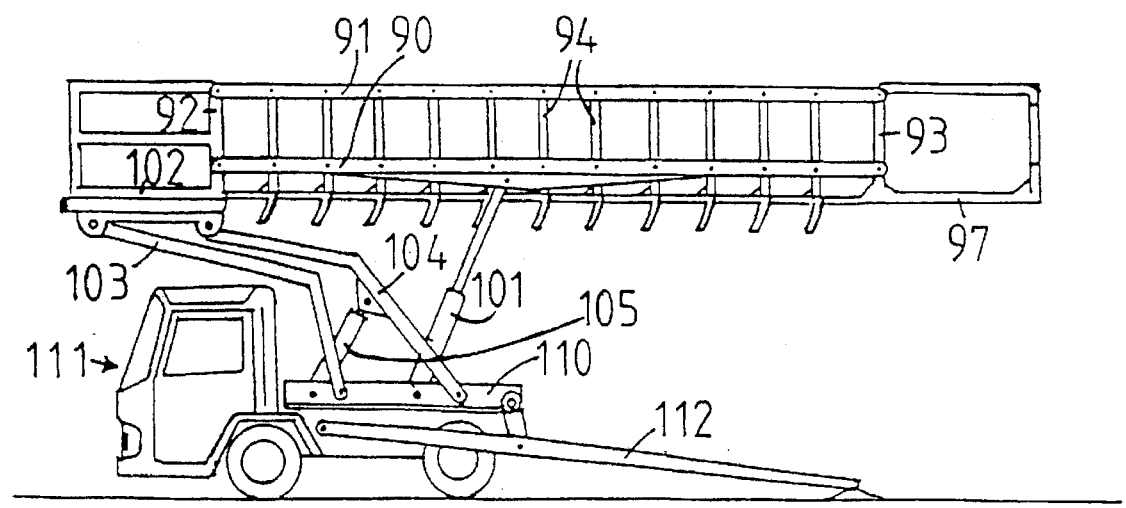

FIGS. 23 and 24 show a similar embodiment as in FIGS. 21 and 22, but wherein the apparatus is especially intended for use as a large aircraft stairway. In this embodiment the combined stairway and lift apparatus is mounted on a vehicle, and more specifically on the plane 110 of a lorry 111. Support legs 112, which are directed outwards from the side and backward from the lorry, give a good stability in use of the lift. Like the embodiment according to FIG. 21, this embodiment gives great possibilities of variation with respect to height adjustment. The lifting means suitably may be coupled to the motor of the vehicle.

Figure 25:
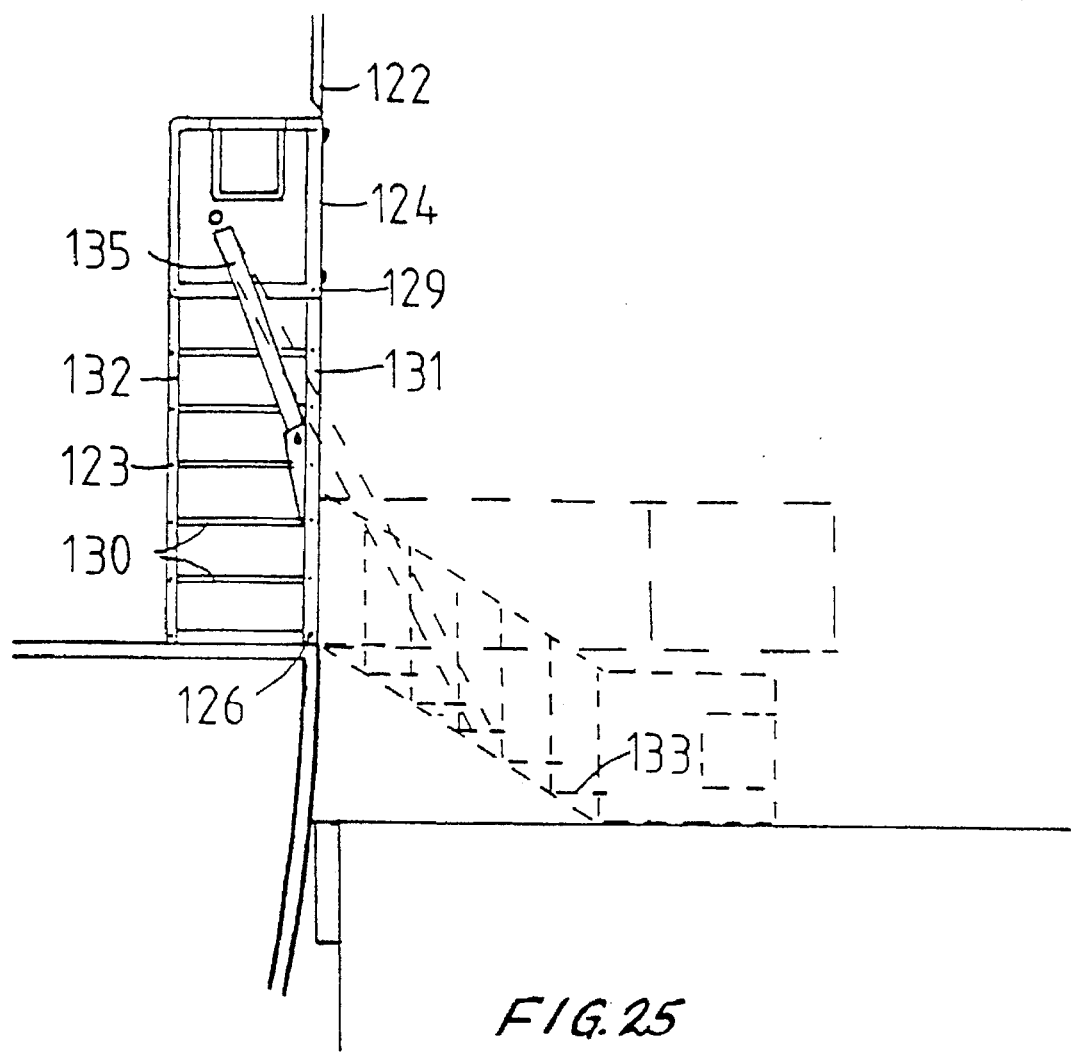
FIG. 25 shows a side view of a combined stairway and lift apparatus installed on the inside of a door-forming plate in an opening in a side wall of a sea vessel.

A further embodiment of the combined stairway and lift apparatus according to the invention is shown in FIGS. 25 and 26. The apparatus here is arranged as a part of a door or door scuttle 120 in a wall opening 121 in a side wall 22 of a vessel, e.g. a ferry or a catamaran vessel. Thus, the stairway 123 and the platform 124 of the apparatus are mounted on the inside of, or constitute a part of, a door-forming plate 120 which is pivotally mounted about a horizontal axis 126 at the lower end of the wall opening 121, the plate 120 being divided into two parts 127, 128 which are hinged to each other at a transverse axis 129 at the transition between stairway and platform.

On the background of the previously described embodiments, the construction of the stairway 123 and the platform 124 should be clear from FIGS. 25 and 26, so that a further description should be unnecessary.

The door scuttle 120 is opened in that it is tilted out about the axis 126. When the stairway reaches ground level, the connecting stays 130 between the parallel stays 131 and 132 are vertical, and the steps 133 are horizontal. The platform 124 is horizontal, since it is rigidly connected to the lower connecting stay. At the underside of the platform, there are arranged rollers or wheels 134, e.g. of rubber, for movement of the platform on the base in connection with tide differences.

Figures 26A, 26B, 26C:
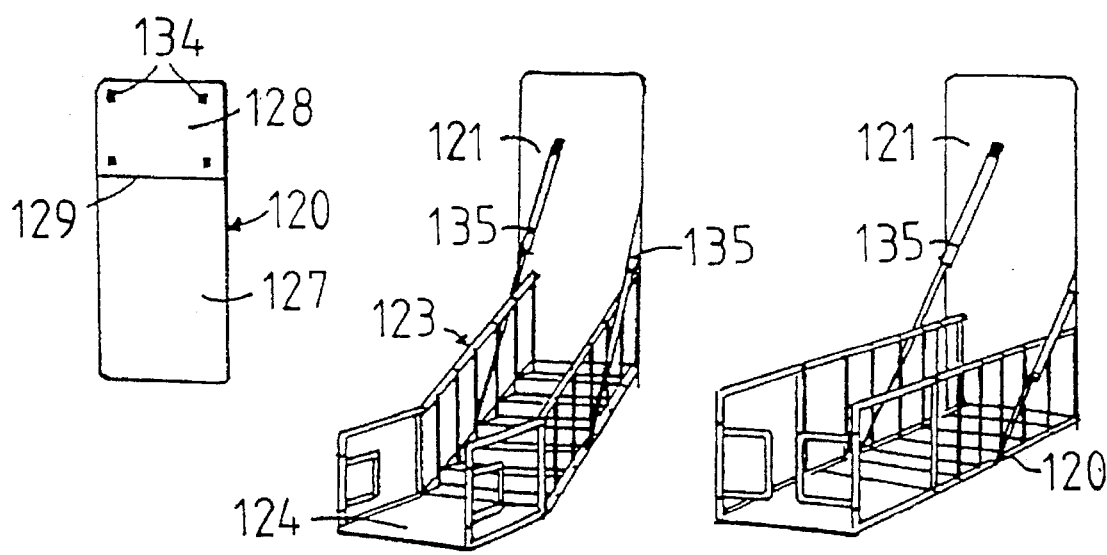
FIGS. 26A, B, C show sections of the vessel side wall with the apparatus in FIG. 25.

On each side of the stairway, there is arranged a, e.g., hydraulic lifting means 135 by means of which the stairway and the platform may be raised to the horizontal position shown in FIG. 26C. The two parts 127, 128 of the door scuttle may be locked to each other when they are in the horizontal position, so that the door scuttle 120 forms a planar surface when it is closed.

Figures 27, 28:
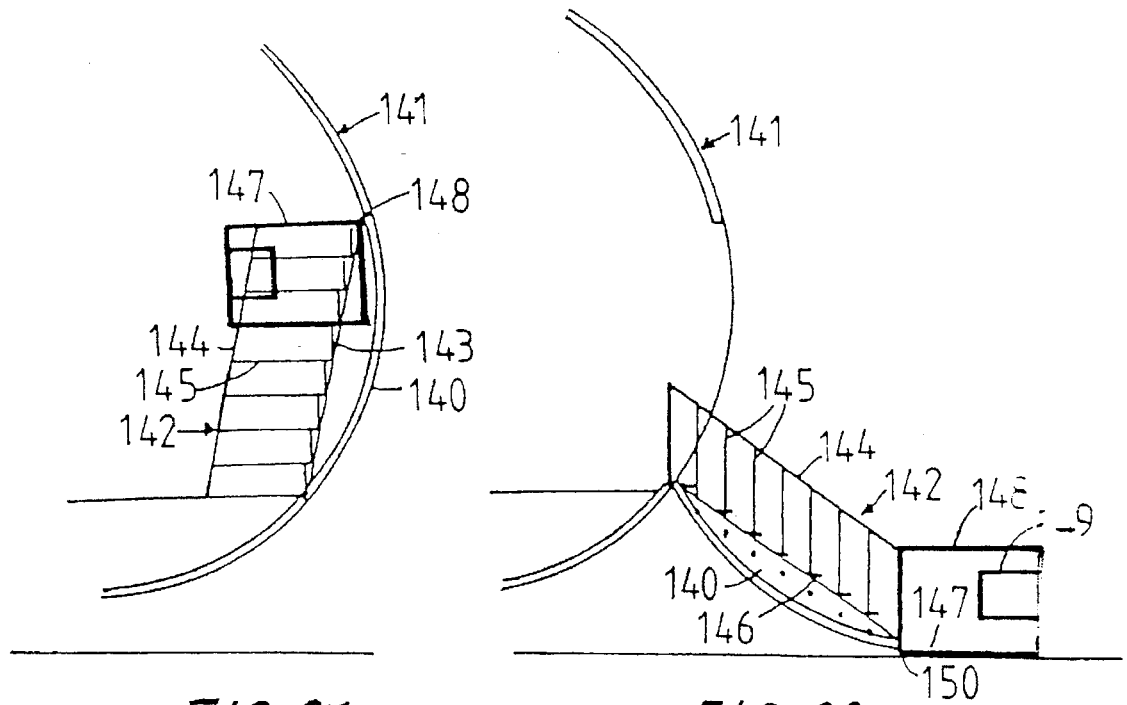
FIG. 27 shows a side view of a combined stairway and lift apparatus installed at the inside of the door in a passenger aircraft.
FIGS. 28 and 29 show a side view and a perspective view, respectively, of the apparatus in FIG. 27, with the door in opened turned-down position.
Figure 29:
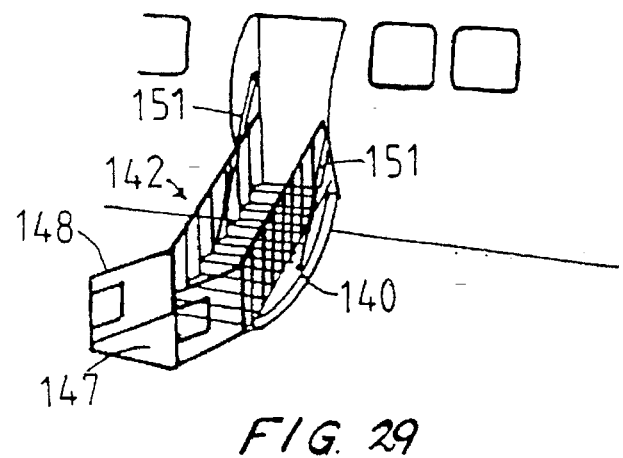

FIGS. 27–28 show an embodiment wherein the combined stairway and lift apparatus according to the invention is used in connection with, e.g., an aircraft door 140 in an aircraft 141. Traditionally, doors on smaller airplanes are used as a stairway with fixed steps. By means of the present apparatus, such doors may get an entirely new function, viz. as a lift for wheelchairs or the like, and for passengers with reduced health.

In this embodiment, at the inside of the door 140, there is arranged a stairway 142 consisting of a pair of parallel stays 143, 144, a number of transversely extending connecting stays 145 and respective steps 146 which are hingedly connected to the connecting stays, so that they may pivot between a position parallel with the connecting stays and a position at right angles thereto. Furthermore, there is arranged a platform 147 which is provided with a railing 148 having a rotatable safety gate 149, as in the previously described embodiments. The platform is rotatable about a horizontal axis 150 at the lower edge of the stairway 142 in the operating position. The turning may take place by means of a hydraulic, pneumatic or electric device. Also the door 140 may be turned in a corresponding manner.

When the door 140 is opened in that it is turned out, the stairway and the platform follow. When the door reaches ground level, the connecting stays 145 are vertical, and the steps 146 horizontal. The platform 147 is connected to the stairway 142 only at the lower edge of the stairway, i.e., about the axis 150. The railing 148 on the platform is constructed so that when the platform is turned from the storage position (in FIG. 27) to the operative position, the lowermost end of the railing-forming parallel stay 144 hooks onto the railing 148 on the platform, so that the platform becomes rigidly connected to the stairway.

On each side of the stairway 142 there is arranged a, hydraulic lifting means 151 by means of which the stairway and the platform may be raised to a horizontal position, so that, a wheelchair on the platform can drive into the airplane.

Such an apparatus may also find its application on helicopters, catamarans, etc.

Figure 30:
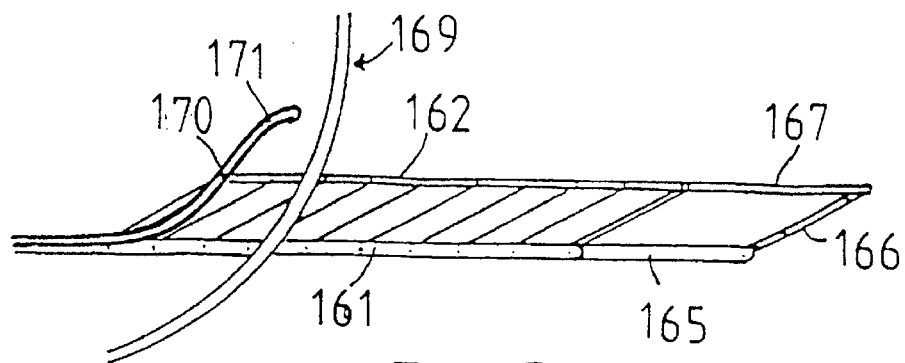
FIGS. 30–32 show side views of a combined stairway and lift apparatus constructed as a collapsible aircraft stairway in a larger passenger aircraft, and of the type which may be stored within the aircraft when it is not in use.
Figure 31:
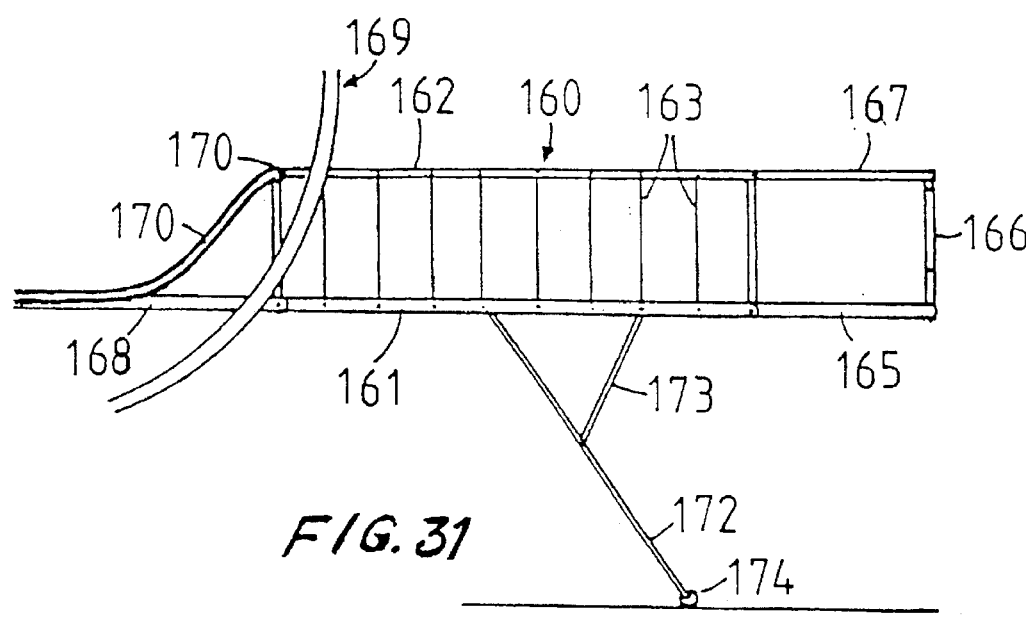
Figure 32:
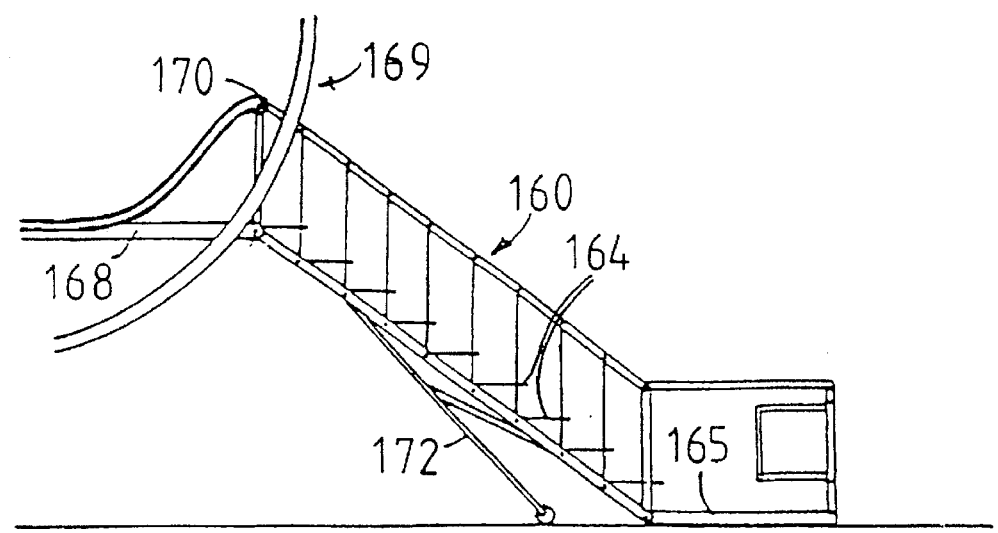

A further embodiment of the apparatus according to the invention is shown in FIGS. 30-32. The apparatus here is adapted for use in connection with a collapsible, extractable stairway of the type often used on larger passenger aircrafts, and then is stored transversely within the aircraft body. The stairway 160 comprises a railing in the form of two parallel stays 161, 162 (on each side of the stairway) and a number of transversely extending connecting stays 163 which are pivotally connected to the parallel stays and at their lower ends are pivotally connected to respective steps or treads 164, so that the steps are rotatable between a position parallel with the connecting stays and a position at right angles thereto. Further, a platform 165 is articulated to the outer ends of the lower parallel stays 161. The platform is provided with a railing of a similar embodiment as described earlier, but which in this case consists of vertical and horizontal members 166, 167 which are articulated to each other. Thus, the stairway as well as the platform arrangement may be folded with turning of the stays, as suggested in FIG. 30.

The lower parallel stays 161 at their inner end are connected to a respective operating arm 168 to push out or pull in the stairway transversely to the aircraft 169. The upper parallel stays 162 at the upper end of the stairway are provided with a respective laterally projecting pin 170 for engagement in associated guide grooves 171 arranged in the aircraft body on each side of the stairway, so that the railing of the stairway is carried to erected and folded position, respectively, by displacement of the stairway 160 and the platform 165 to an outer position and an inner storage position, respectively. Then, in the erected position, the connecting stays 163 are vertical and the steps 164 horizontal.

For support of the stairway 160 with the platform 165 in the pushed-out horizontal position shown in FIG. 31, there is arranged a pair of support legs 172 which, with their upper ends, are displaceably and rotatably connected to the lower parallel stays 161, and which further are connected to the stays via link arms 173 in the shown manner. In pushing-out of the stairway, the support legs 172 simultaneously are pushed out to the position shown in FIG. 31 by means of a suitable operating means which may be driven electrically, hydraulically or pneumatically. The apparatus is lowered to the position shown in FIG. 32 in that the upper ends of the support legs are pulled towards the aircraft body. The lower ends of the support legs are provided with wheels 174 to roll on the base in lowering and raising of the apparatus. When the apparatus is to be used as a lift apparatus for a wheelchair placed on the platform, the platform is raised to a horizontal position in that said operating means pushes the support legs to the position shown in FIG. 31. As one will appreciate, the conventional collapsible aircraft stairway has got an entirely new function by being combined with the apparatus according to the invention.

As appears from the above, the combined stairway and lift apparatus according to the invention may be adapted and used in an advantageous manner in many different fields of use, and in an efficient manner solves the existing problems in the fields discussed in the introduction.

The apparatus may, however, also be used in additional fields. For example, it may be used on stadiums, in concert halls, etc., for raising a wheelchair to a higher point on the tribune or in the hall where there is no access to a traditional lift or hoist.

I claim:
1. A combined stairway and hoist apparatus, comprising:
a stairway having a first end and a second end;
lifting means for raising and lowering said stairway at said first end thereof;
said stairway having steps so designed that they at all times during raising and lowering of the stairway remain horizontal with a respective mutual equal rise and form a flush surface when said stairway is in a horizontal position;
support means at said second end of said stairway;
parallel stays each having a respective first end pivotally connected to said support means, said parallel stays extending along said stairway;
additional stays each having a first and a second end, said first end of said additional stays being pivotally connected to one of said parallel stays and said second end of said additional stays being connected to one of said parallel stays;
said additional stays being essentially vertical in an operating position;
a horizontal platform at said first stairway end;
means interconnecting said platform and said stairway so that said stairway steps form a planar surface flush with said platform when said stairway is in a horizontal position.
2. An apparatus according to claim 1, wherein:
said parallel stays constitute string and railing members along the side of said stairway;
said vertical additional stays form balusters in a railing including said railing members;
said support structure is constituted by a column with which the string and railing members respectively are connected.

3. An apparatus according to claim 2, wherein:

said additional stays are rigidly connected to said steps, perpendicular to tread surfaces of said steps.

4. An apparatus according to claim 2, wherein:

said vertical additional stays are hingedly connected to said steps, so that said steps are rotatable between a position parallel with vertical, additional stays, and a position at right angles thereto.

5. An apparatus according to claim 2, wherein:

said string and railing members at respective lower ends thereof are pivotally connected to a hollow column in which said lifting means is built in, said lifting means being wheel-supported for movement along a base when raising and lowering said stairway and said horizontal platform.

6. An apparatus according to claim 2, wherein:

said platform in the transverse direction of said stairway is divided into two or more members which are displaceably arranged on top of each other, so that said platform can be pushed together and extended in the longitudinal direction of said stairway.

7. An apparatus according to claim 2, wherein:

said support means at the first end of the stairway comprises a platform which is raisable and lowerable by means of a separate lifting means.

8. An apparatus according to claim 2, wherein:

said stairway and said horizontal platform are mounted at the inside of a scuttle or door-forming plate which is pivotally mounted about a horizontal axis at a lower end of a wall opening, and which is divided at a transversely extending hinge axis at a transition between said stairway and said horizontal platform, so that said stairway and said horizontal platform can be brought into an operative position by swinging-out said door plate by means of said lifting means.

9. An apparatus according to claim 2, wherein:

said stairway is displaceably mounted as a collapsible stairway in a body of an aircraft;

respective of said railing members at said first end of said stairway being provided with a laterally projecting pin for engagement in associated guide grooves in said aircraft body on each side of said stairway, so that said railing of said stairway is carried to an erected and to a folded position, respectively, with displacement of said stairway and said horizontal platform to an operating position and a storage position, respectively.

10. A combined stairway and hoist apparatus, comprising:

a stairway which, by a lifting means, may be raised and lowered at least at one end, and which is designed so that steps of said stairway all the time are horizontal during raising and lowering movement;

the stairway, when in a horizontal position, forming a planar surface which is flush with a raisable and lowerable platform;

said platform being interconnected with said stairway at a lower end of said stairway;

said stairway, together with said platform raisable and lowerable by means of parallel stays which, at one end are pivotally connected to a support means provided at an upper end of the stairway, the parallel stays along their length being pivotally connected to a number of additional stays which are connected to respective steps and are essentially vertical in operating position; wherein:

said parallel stays are arranged below said steps;

said support means are constituted by a floor structure at said upper end of said stairway, and said parallel stays are further connected to said platform via a movement-transferring arm system.

* * * * *